UNITED STATES PATENT OFFICE.

JOHN V. BRAUCH AND BENNARD HEMANN, OF BELLEVILLE, ILLINOIS.

COATING FOR METALS.

SPECIFICATION forming part of Letters Patent No. 712,758, dated November 4, 1902.

Application filed March 5, 1902. Serial No. 96,845. (No specimens.)

*To all whom it may concern:*

Be it known that we, JOHN V. BRAUCH and BENNARD HEMANN, citizens of the United States, residing in Belleville, in the county of St. Clair and State of Illinois, have invented certain new and useful Improvements in Coatings for Metals, of which the following is a full, clear, and exact description.

Our invention relates to a coating for application to metals, particularly iron and steel, for the purpose of protecting them from moisture and the elements to prevent deterioration by rust, oxidation, or other damaging effects; and the invention consists in features of novelty hereinafter fully described, and pointed out in the claims.

The coating comprises a composition composed of a mixture of crude turpentine, linseed-oil, and fish-oil. These ingredients are used in proportions to suit varying conditions and the metals to which the coating is applied; but in practice we have found the best results to be obtained in their use in the following percentages: crude turpentine, twenty per cent.; linseed-oil, forty per cent.; fish-oil, forty per cent.

In the process of applying our coating to metals we first treat the metals by subjecting them to a suitable chemical bath, such as sulfuric acid, for the purpose of removing any scale or foreign matter and render the metal of a thoroughly smooth and clean condition. After the metal has been treated as stated it is thoroughly washed to remove the cleansing agent therefrom. The metal is then immersed in the coating composition, which is maintained during the immersion at a high temperature, preferably boiling-point, and then removed to be dried. The metal is then placed in a suitable oven and permitted to remain there until dry, the heat of the oven being maintained at a degree suitable to effect the drying of the coating upon the metal without injury and also one that will cause the composition to thoroughly permeate the pores of the metal, so that it will adhere firmly thereto.

In our coating the crude turpentine supplies an adhesive quality in the coating that causes it to adhere firmly to the metal, so that when dried it cannot peel or crack off, the linseed-oil furnishes the requisite dissolving property for the crude turpentine in order to obtain complete fluidity that will cause thorough intermixture of the ingredients of the composition, and the fish-oil affords resistance to the action of heat in the process of drying the coating on the metal by furnishing elasticity to the coating and preventing cracking or breaking of the coating on the metal both during the drying operation and subsequent thereto in the use of the coated metal.

We claim as our invention—

1. The composition for coating metals comprising crude turpentine, linseed-oil and fish-oil.

2. The combination for coating metals consisting of crude turpentine, linseed-oil and fish-oil, substantially in the proportions of twenty per cent. crude turpentine, forty per cent. linseed-oil and forty per cent. fish-oil.

JOHN V. BRAUCH.
BENNARD HEMANN.

In presence of—
M. M. McCONAUGHY,
P. CHUSE, Jr.